(12) United States Patent
Ito et al.

(10) Patent No.: US 11,463,285 B2
(45) Date of Patent: Oct. 4, 2022

(54) SIGNAL ANALYSIS APPARATUS AND SIGNAL ANALYSIS METHOD

(71) Applicant: ANRITSU CORPORATION, Kanagawa (JP)

(72) Inventors: Shinichi Ito, Kanagawa (JP); Shunsuke Hinooka, Kanagawa (JP); Yoshitaka Kihara, Kanagawa (JP); Mamoru Iwamoto, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 17/468,795

(22) Filed: Sep. 8, 2021

(65) Prior Publication Data

US 2022/0103402 A1 Mar. 31, 2022

(30) Foreign Application Priority Data

Sep. 30, 2020 (JP) .............................. JP2020-165372

(51) Int. Cl.
*H04L 25/03* (2006.01)
*H04B 1/26* (2006.01)

(52) U.S. Cl.
CPC .......... *H04L 25/03891* (2013.01); *H04B 1/26* (2013.01)

(58) Field of Classification Search
CPC ............................ H04L 25/03891; H04B 1/26
See application file for complete search history.

(56) References Cited

U.S. PATENT DOCUMENTS

2007/0206661 A1* 9/2007 Okada ................ A61B 1/00016
375/141
2019/0181888 A1* 6/2019 Naito ................... H04B 1/1036

FOREIGN PATENT DOCUMENTS

JP 5947943 B1 7/2016

\* cited by examiner

*Primary Examiner* — Natasha W Cosme
(74) *Attorney, Agent, or Firm* — Pearne & Gordon LLP

(57) ABSTRACT

A signal analysis apparatus includes a frequency conversion unit 10 that includes a first local oscillator 11 which outputs a first local oscillation signal $S_{LO1}$ of a frequency $f_{LO1}$, a first mixer 12 which generates a first spurious signal of a frequency $f_{SP1}$, a first BPF 13 of a passed center frequency $f_0$, a second local oscillator 14 which outputs a second local oscillation signal $S_{LO2}$ of a frequency $f_{LO2}$, and a second BPF 16 of a passed bandwidth W, and that performs frequency conversion of a measured signal $S_{RF}$ of a frequency $f_{RF}$ (center frequency fc), in which the frequency $f_{LO1}$ and the frequency $f_{LO2}$ are shifted using a frequency shift amount $\Delta f$ that does not establish a relationship of $-W/2 \leq |f_{SP1} - f_0 \pm f_{IF2} - \Delta f| - f_{IF2} \leq +W/2$.

4 Claims, 5 Drawing Sheets

| $f_c$[GHz] | $f_{SP1}$[GHz] | $\Delta f$ [GHz] | $f_{IF1}$[GHz] | $f_{LO1}$[GHz] | $f_{LO2}$[GHz] | $f_{SP2}$[GHz] | $f_{IF2} \pm W/2$[GHz] |
|---|---|---|---|---|---|---|---|
| 4.75 | 9.5 | 0 | 9.8 | 14.55 | 7.85 | 1.65 | 1.795~2.105 |
| 4.8 | 9.6 | 0.35 | 9.8 | 14.6 | 7.85 | 1.4 | 1.795~2.105 |
| 4.85 | 9.7 | 0.35 | 10.15 | 15 | 8.2 | 1.5 | 1.795~2.105 |
| 4.9 | 9.8 | −0.35 | 9.45 | 14.35 | 7.5 | 2.3 | 1.795~2.105 |
| 4.95 | 9.9 | −0.35 | 9.45 | 14.4 | 7.5 | 2.4 | 1.795~2.105 |
| 5 | 10 | −0.35 | 9.8 | 14.8 | 7.85 | 2.5 | 1.795~2.105 |
| 5.05 | 10.1 | 0 | 9.8 | 14.85 | 7.85 | 2.25 | 1.795~2.105 |

FIG. 2

SIGNAL ANALYSIS APPARATUS AND SIGNAL ANALYSIS METHOD

TECHNICAL FIELD

The present invention relates to a signal analysis apparatus and a signal analysis method and particularly, to a signal analysis apparatus and a signal analysis method using a superheterodyne method.

BACKGROUND ART

In the related art, a signal analysis apparatus that receives an RF signal of a wide band output from a device under test as a measured signal and performs frequency analysis on the measured signal has been known (for example, refer to Patent Document 1).

For example, as illustrated in FIG. 5, the signal analysis apparatus of the related art includes a first mixer 61, a first bandpass filter (BPF) 62, a second mixer 63, a second BPF 64, an AD converter (ADC) 65, and a signal analysis unit 66.

The first mixer 61, by performing frequency mixing of a measured signal of a frequency $f_{RF}$ (center frequency $f_c$) with a first local oscillation signal of a frequency $f_{LO1}$, generates output signals of a sum component and a difference component of frequencies of the two signals, that is, output signals of frequencies $f_{RF}+f_{LO1}$ and $|f_{RF}-f_{LO1}|$. The first BPF 62 allows the output signal of the difference component from the first mixer 61 to pass as an intermediate frequency signal having an intermediate frequency $f_{IF}$ and removes the output signal of the sum component from the first mixer 61.

The second mixer 63, by performing the frequency mixing of the signal passing through the first BPF 62 with a second local oscillation signal of a frequency $f_{LO2}$, generates output signals of a sum component and a difference component of the frequencies of the two signals. The second BPF 64 allows the output signal of the difference component from the second mixer 63 to pass and removes the output signal of the sum component from the second mixer 63.

The ADC 65 performs AD conversion of the signal passing through the second BPF 64 into binary digital data having a predetermined number of bits by sampling the signal at a predetermined sampling frequency. The signal analysis unit 66 analyzes the signal after the AD conversion performed by the ADC 65.

A harmonic of the measured signal is generated in the first mixer 61, and the harmonic is input into the first BPF 62. For example, a case where a passed center frequency of the first BPF 62 is 9.8 GHz, the center frequency $f_c$ of the measured signal is 4.9 GHz, and the frequency $f_{LO1}$ of the first local oscillation signal is 14.7 GHz is considered. Here, a problem arises in that a second harmonic of the measured signal appears as a spurious signal within a frequency range centered at 9.8 GHz and cannot be distinguished due to overlap with the frequency $f_{RF}$ of a desired wave of the measured signal.

Furthermore, as illustrated in FIG. 6, a frequency component of 4.85 GHz in the measured signal having the center frequency $f_e$ of 4.9 GHz is handled as a spurious signal of 9.7 GHz by the first mixer 61. Meanwhile, a center frequency of the desired wave obtained as the output signal of the difference component from the first mixer 61 is 9.85 GHz. Here, in a case where frequency components corresponding to 9.7 GHz of the spurious signal and 9.85 GHz of the desired wave of the measured signal are included in a passed bandwidth W of the second BPF 64 of a rear stage, there is a possibility of an adverse effect on a signal analysis result of the signal analysis unit 66.

RELATED ART DOCUMENT

Patent Document

[Patent Document 1] Japanese Patent No. 5947943

DISCLOSURE OF THE INVENTION

Problem that the Invention is to Solve

In order to avoid the above problem of being unable to distinguish the harmonic of the measured signal generated by the first mixer 61 due to overlap with the desired wave of the measured signal, a frequency relationship in which the harmonic and the desired wave of the measured signal do not overlap may be selected upon designing. For doing so, for example, a design that increases the passed center frequency of the first BPF 62 is considered. However, a problem arises in that a design difficulty or a cost of hardware related to frequency conversion including the first BPF 62 rises.

The present invention is conceived in order to solve such a problem of the related art, and an object thereof is to provide a signal analysis apparatus and a signal analysis method capable of analyzing a measured signal while avoiding a spurious harmonic of the measured signal generated by a mixer, without changing a configuration of hardware related to frequency conversion.

Means for Solving the Problem

In order to solve the above problem, a signal analysis apparatus according to the present invention is a signal analysis apparatus that analyzes a measured signal having a frequency component $f_{RF}$ and includes a frequency setting unit that decides a first intermediate frequency $f_{IF1}$, a frequency $f_{LO1}$ of a first local oscillation signal, and a frequency $f_{LO2}$ of a second local oscillation signal in accordance with a center frequency $f_c$ of the measured signal, a first local oscillator that outputs the first local oscillation signal, a first mixer that generates a first intermediate frequency signal of the first intermediate frequency $f_{IF1}$ by performing frequency mixing of the measured signal with the first local oscillation signal and generates a first spurious signal including a second harmonic component of the measured signal, a first bandpass filter of a passed center frequency $f_0$ into which the first intermediate frequency signal and the first spurious signal are input, a second local oscillator that outputs the second local oscillation signal, a second mixer that generates a second intermediate frequency signal of a second intermediate frequency $f_{IF2}$ by performing frequency mixing of the first intermediate frequency signal passing through the first bandpass filter with the second local oscillation signal and generates a second spurious signal by performing frequency mixing of the first spurious signal passing through the first bandpass filter with the second local oscillation signal, a second bandpass filter of a passed bandwidth W into which the second intermediate frequency signal and the second spurious signal are input, and that allows the second intermediate frequency signal to pass and removes the second spurious signal, an AD converter that performs AD conversion of the second intermediate frequency signal passing through the second bandpass filter, and a signal analysis unit that analyzes the second intermediate frequency signal after the AD conversion performed by the AD converter, in which the first intermediate frequency $f_{IF1}$ is provided as $f_0+\Delta f$, the frequency $f_{LO1}$ of the first local oscillation signal is provided as $f_c+f_0+\Delta f$, the frequency $f_{LO2}$ of the second local oscillation signal is provided as $f_0 \pm f_{IF2}+\Delta f$, a frequency $f_{SP1}$ of the first spurious signal is provided as $2 \times f_{RF}$, a frequency $f_{SP2}$ of the second spurious signal is provided as $|f_{SP1}-f_0 \pm f_{IF2}-\Delta f|$, and the frequency setting unit decides the frequency shift amount $\Delta f$ that does not establish a relationship of $-W/2 \leq |f_{SP1}-f_0 \pm f_{IF2}-\Delta f|-f_{IF2} \leq +W/2$, and decides the first intermediate frequency $f_{IF1}$, the frequency $f_{LO1}$ of the first local oscillation signal, and the frequency $f_{LO2}$ of the second local oscillation signal.

According to this configuration, the signal analysis apparatus according to the present invention decides the first intermediate frequency $f_{IF1}$, the frequency $f_{LO1}$, and the frequency $f_{LO2}$ in accordance with the center frequency $f_c$ of the measured signal. Accordingly, by varying the first intermediate frequency $f_{IF1}$, the frequency $f_{LO1}$, and the frequency $f_{LO2}$, the signal analysis apparatus according to the present invention can analyze the measured signal while avoiding a spurious harmonic of the measured signal generated by the first mixer, without changing a configuration of hardware related to frequency conversion. Furthermore, even in a case where a standard that uses a new band is established in the future, the signal analysis apparatus according to the present invention can perform measurement that avoids a spurious harmonic, without changing the configuration of the hardware related to the frequency conversion.

In addition, in the signal analysis apparatus according to the present invention, in a case where a relationship of $-W/2 \leq |f_{SP1}-f_0 \pm f_{IF2}|-f_{IF2} \leq +W/2$ is not established, the frequency setting unit may decide the frequency shift amount $\Delta f$ as $\Delta f=0$.

In addition, in the signal analysis apparatus according to the present invention, in a case where a relationship of $-W/2 \leq |f_{SP1}-f_0 \pm f_{IF2}|-f_{IF2} \leq +W/2$ is established, the frequency setting unit may decide the frequency shift amount $\Delta f$ capable of allowing the second intermediate frequency signal to pass and removing the second spurious signal at the second bandpass filter.

According to these configurations, since the first intermediate frequency $f_{IF1}$, the frequency $f_{LO1}$, and the frequency $f_{LO2}$ can be separately used by shifting the first intermediate frequency $f_{IF1}$, the frequency $f_{LO1}$, and the frequency $f_{LO2}$ by the frequency shift amount $\Delta f$, the signal analysis apparatus according to the present invention can receive a desired wave of the second intermediate frequency $f_{IF2}$ while removing an unnecessary spurious harmonic of the frequency $f_{SP2}$ using the second BPF of the passed bandwidth W. In other words, the signal analysis apparatus according to the present invention can separate the first intermediate frequency $f_{IF1}$ and the frequency $f_{SP1}$ of the first spurious signal generated by the first mixer, using the second BPF of the rear stage.

In addition, a signal analysis method according to the present invention is a signal analysis method for analyzing a measured signal including a frequency component fRF and includes a frequency setting step of deciding a first intermediate frequency $f_{IF1}$, a frequency $f_{LO1}$ of a first local oscillation signal, and a frequency $f_{LO2}$ of a second local oscillation signal in accordance with a center frequency $f_c$ of the measured signal, a first local oscillation step of outputting the first local oscillation signal, a first frequency mixing step of generating a first intermediate frequency signal of the first intermediate frequency $f_{IF1}$ by performing frequency mixing of the measured signal with the first local oscillation signal, and generating a first spurious signal including a second harmonic component of the measured signal, a first bandpass step of a passed center frequency $f_0$ into which the first intermediate frequency signal and the first spurious signal are input, a second local oscillation step of outputting the second local oscillation signal, a second frequency mixing step of generating a second intermediate frequency signal of a second intermediate frequency $f_{IF2}$ by performing frequency mixing of the first intermediate frequency signal passing through the first bandpass step with the second local oscillation signal, and generating a second spurious signal by performing frequency mixing of the first spurious signal passing through the first bandpass step with the second local oscillation signal, a second bandpass step of a passed bandwidth W into which the second intermediate frequency signal and the second spurious signal are input, the second intermediate frequency signal is allowed to pass, and the second spurious signal is removed, an AD conversion step of performing AD conversion of the second intermediate frequency signal passing through the second bandpass step, and a signal analysis step of analyzing the second intermediate frequency signal after the AD conversion in the AD conversion step, in which the first intermediate frequency $f_{IF1}$ is provided as $f_0+\Delta f$, the frequency $f_{LO1}$ of the first local oscillation signal is provided as $f_c+f_0+\Delta f$, the frequency $f_{LO2}$ of the second local oscillation signal is provided as $f_0 \pm f_{IF2}+\Delta f$, a frequency $f_{SP1}$ of the first spurious signal is provided as $2 \times f_{RF}$, a frequency $f_{SP2}$ of the second spurious signal is provided as $|f_{SP1}-f_0 \pm f_{IF2}-\Delta f|$, and in the frequency setting step, the frequency shift amount $\Delta f$ that does not establish a relationship of $-W/2 \leq |f_{SP1}-f_0 \pm f_{IF2}-\Delta f|-f_{IF2} \leq +W/2$ is decided, and the first intermediate frequency $f_{IF1}$, the frequency $f_{LO1}$ of the first local oscillation signal, and the frequency $f_{LO2}$ of the second local oscillation signal are decided.

According to this configuration, in the signal analysis method according to the present invention, the first intermediate frequency $f_{IF1}$, the frequency $f_{LO1}$, and the frequency $f_{LO2}$ are decided in accordance with the center frequency $f_c$ of the measured signal. Accordingly, by varying the first intermediate frequency $f_{IF1}$, the frequency $f_{LO1}$, and the frequency $f_{LO2}$, in the signal analysis method according to the present invention, the measured signal can be analyzed while avoiding a spurious harmonic of the measured signal generated by the first mixer, without changing a configuration of hardware related to frequency conversion. Furthermore, even in a case where a standard that uses a new band is established in the future, in the signal analysis method according to the present invention, measurement that avoids a spurious harmonic can be performed without changing the configuration of the hardware related to the frequency conversion.

Advantage of the Invention

The present invention provides a signal analysis apparatus and a signal analysis method capable of analyzing a measured signal while avoiding a spurious harmonic of the measured signal generated by a mixer, without changing a configuration of hardware related to frequency conversion.

BRIEF DESCRIPTION OF THE DRAWINGS

FIG. 2 is a table illustrating a frequency relationship of each unit constituting a frequency conversion unit of the signal analysis apparatus according to the embodiment of the present invention.

FIG. 3A illustrates a case where a center frequency $f_c$ of the measured signal is within a range of 4.8 GHz≤$f_c$<4.9 GHz, and FIG. 3B illustrates a case where the center frequency $f_c$ of the measured signal is within a range of 4.9 GHz≤$f_c$≤5 GHz.

BEST MODE FOR CARRYING OUT THE INVENTION

Hereinafter, an embodiment of a signal analysis apparatus and a signal analysis method according to the present invention will be described using the drawings.

Figure 1:
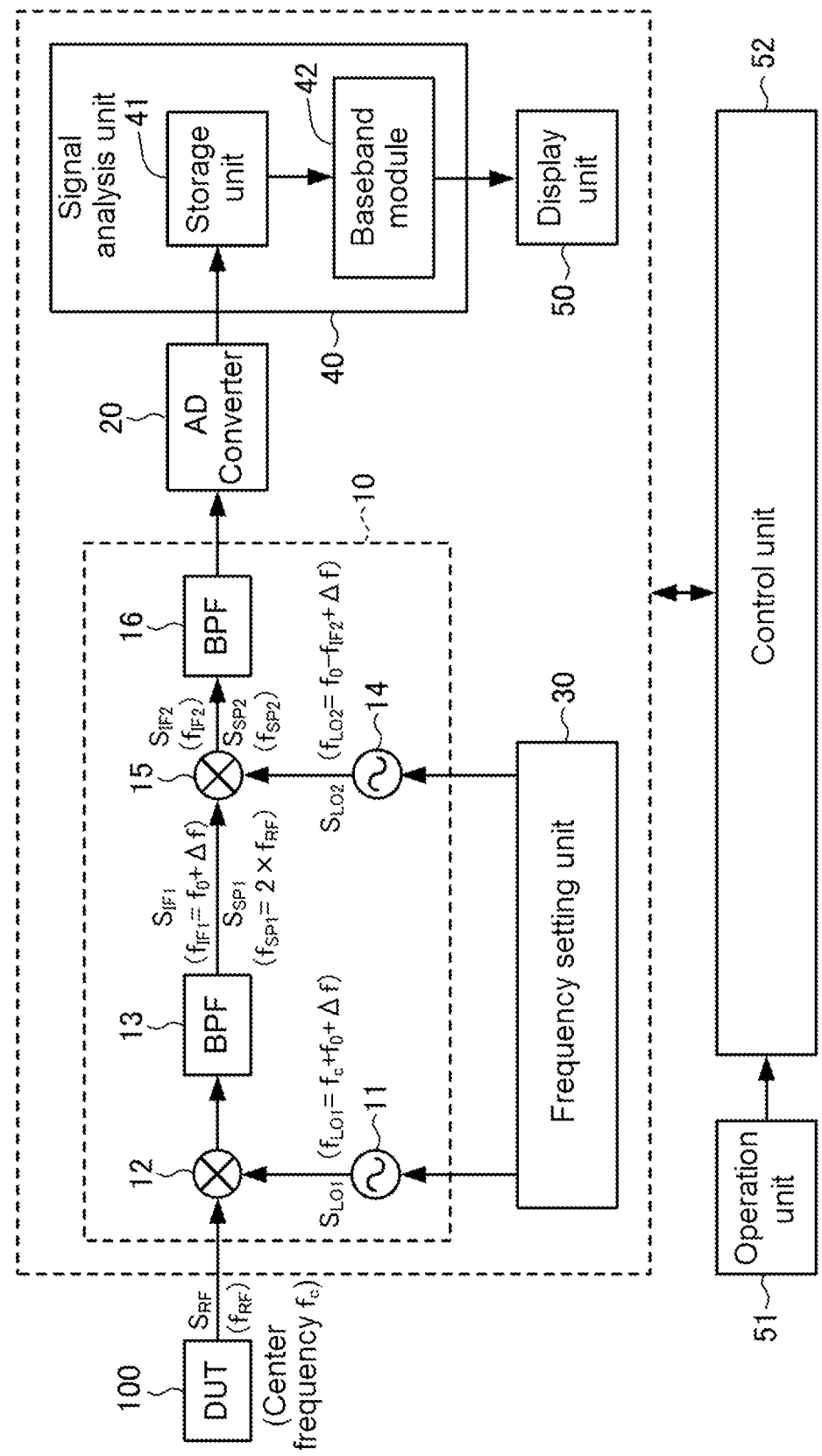
FIG. 1 is a block diagram illustrating a configuration of a signal analysis apparatus according to an embodiment of the present invention.

As illustrated in FIG. 1, a signal analysis apparatus 1 according to the embodiment of the present invention is an apparatus for analyzing a measured signal $S_{RF}$ of a frequency $f_{RF}$ (center frequency $f_c$) output from a device under test (DUT) 100 and includes a frequency conversion unit 10, an AD converter 20, a frequency setting unit 30, a signal analysis unit 40, a display unit 50, an operation unit 51, and a control unit 52.

For example, the DUT 100 is a mobile terminal or a base station that includes a wireless communication antenna and an RF circuit and can output an analog RF signal. Examples of a communication standard of the DUT 100 include 5G NR, TD-LTE, FDD-LTE, LTE-Advanced, GSM (registered trademark), TD-SCDMA, W-CDMA (registered trademark), CDMA2000, and Bluetooth (registered trademark). The DUT 100 and the frequency conversion unit 10 may be connected in a wired manner through a coaxial cable or the like, or may be connected in a wireless manner through a wireless communication antenna.

The frequency conversion unit 10 performs frequency conversion of a frequency of the analog RF signal as the measured signal $S_{RF}$ output from the DUT 100 and includes a first local oscillator 11, a first mixer 12, a first BPF 13, a second local oscillator 14, a second mixer 15, and a second BPF 16.

For example, the first local oscillator 11 is configured with a PLL circuit and receives a control signal from the frequency setting unit 30, described later, and outputs a sine wave of a frequency $f_{LO1}$ that is higher than the original frequency $f_{RF}$ of the measured signal $S_{RF}$ by a frequency of a conversion result, to the first mixer 12 as a first local oscillation signal $S_{LO1}$.

The first mixer 12, by performing frequency mixing of the measured signal $S_{RF}$ of the frequency $f_{RF}$ with the first local oscillation signal $S_{LO1}$ of the frequency $f_{LO1}$ output from the first local oscillator 11, generates output signals of a sum component and a difference component of the frequencies of the two signals, that is, output signals of frequencies $f_{RF}+f_{LO1}$ and $|f_{RF}-f_{LO1}|$. In addition, the first mixer 12 generates an output signal including a second harmonic component of the measured signal $S_{RF}$. Hereinafter, the frequency $|f_{RF}-f_{LO1}|$ will be referred to as a "first intermediate frequency $f_{IF1}$", and the output signal of the frequency $|f_{RF}-f_{LO1}|$ will be referred to as a "first intermediate frequency signal $S_{IF1}$". In addition, the signal including the second harmonic component of the measured signal $S_{RF}$ will be referred to as a "first spurious signal $S_{SP1}$".

The first BPF 13 is a bandpass filter of a passed center frequency $f_0$ disposed between the first mixer 12 and the second mixer 15, and output signals including the first intermediate frequency signal $S_{IF1}$ and the first spurious signal $S_{SP1}$ output from the first mixer 12 are input into the BPF 13. The first BPF 13 allows the first intermediate frequency signal $S_{IF1}$ of the first intermediate frequency $f_{IF1}$ and the first spurious signal $S_{SP1}$ to pass among the output signals from the first mixer 12, and removes the sum component, a third or higher harmonic component of the measured signal $S_{RF}$, and a harmonic component of the first local oscillation signal $S_{LO1}$ among the output signals from the first mixer 12.

For example, the second local oscillator 14 is configured with a PLL circuit and receives a control signal from the frequency setting unit 30, described later, and outputs a sine wave of a frequency $f_{LO2}$ that is lower (or higher) than the original frequency of a signal output from the first BPF 13 by a frequency of a conversion result, to the second mixer 15 as a second local oscillation signal $S_{LO2}$.

The second mixer 15, by performing the frequency mixing of the first intermediate frequency signal $S_{IF1}$ of the first intermediate frequency $f_{IF1}$ passing through the first BPF 13 with the second local oscillation signal $S_{LO2}$ of the frequency $f_{LO2}$ output from the second local oscillator 14, generates output signals of a sum component and a difference component of the frequencies of the two signals, that is, output signals of frequencies $f_{IF1}+f_{LO2}$ and $|f_{IF1}-f_{LO2}|$. In addition, the second mixer 15, by performing the frequency mixing of the first spurious signal $S_{SP1}$ of the frequency $f_{SP1}$ passing through the first BPF 13 with the second local oscillation signal $S_{LO2}$ of the frequency $f_{LO2}$ output from the second local oscillator 14, generates output signals of a sum component and a difference component of the frequencies of the two signals, that is, output signals of frequencies $f_{SP1}+f_{LO2}$ and $|f_{SP1}-f_{LO2}|$.

Hereinafter, the frequency $|f_{IF1}-f_{LO2}|$ will be referred to as a "second intermediate frequency $f_{IF2}$", and the output signal of the frequency $|f_{IF1}-f_{LO2}|$ will be referred to as a "second intermediate frequency signal $S_{IF2}$". In addition, the frequency $|f_{SP1}-f_{LO2}|$ will be referred to as a "frequency $f_{SP2}$", and an output signal of the frequency $f_{SP2}$ will be referred to as a "second spurious signal $S_{SP2}$". That is, the second spurious signal $S_{SP2}$ is an unnecessary wave signal downconverted from the first spurious signal $S_{SP1}$ by the second mixer 15.

For example, the second BPF 16 is a bandpass filter of a passed center frequency $f_{IF2}$ and a passed bandwidth W, and output signals including the second intermediate frequency signal $S_{IF2}$ and the second spurious signal $S_{SP2}$ output from the second mixer 15 are input into the second BPF 16. Here, the passed center frequency $f_{IF2}$ is a fixed value. The second BPF 16 allows the second intermediate frequency signal $S_{IF2}$ of the second intermediate frequency $f_{IF2}$ to pass among the output signals from the second mixer 15 and removes the sum component and the second spurious signal $S_{SP2}$ among the output signals from the second mixer 15.

The AD converter 20 performs AD conversion of the second intermediate frequency signal $S_{IF2}$ passing through the second BPF 16 of the frequency conversion unit 10 into binary digital data having a predetermined number of bits by sampling the second intermediate frequency signal $S_{IF2}$ at a predetermined sampling frequency.

The first intermediate frequency $f_{IF1}$, the frequency $f_{LO1}$ of the first local oscillation signal $S_{LO1}$, the frequency $f_{LO2}$ of the second local oscillation signal $S_{LO2}$, the frequency $f_{SP1}$ of the first spurious signal $S_{SP1}$, and the frequency $f_{SP2}$ of the second spurious signal $S_{SP2}$ are provided by Expressions (1) to (5) below.

$$f_{IF1} = f_0 + \Delta f \quad (1)$$

$$f_{LO1} = f_c + f_{IF1} = f_c + f_0 + \Delta f \quad (2)$$

$$f_{LO2} = f_{IF1} \pm f_{IF2} = f_0 \pm f_{IF2} + \Delta f \quad (3)$$

$$f_{SP1} = 2 \times f_{RF} \quad (4)$$

$$f_{SP2} = |f_{SP1} - f_{LO2}| = |f_{SP1} - f_0 \pm f_{IF2} - \Delta f| \quad (5)$$

The frequency setting unit 30 decides the first intermediate frequency $f_{IF1}$ of the first intermediate frequency signal $S_{IF1}$, the frequency $f_{LO1}$ of the first local oscillation signal $S_{LO1}$, and the frequency $f_{LO2}$ of the second local oscillation signal $S_{LO2}$ in accordance with the center frequency $f_c$ of the measured signal $S_{RF}$ depending on Expressions (1) to (3) above. Furthermore, the frequency setting unit 30 sets the decided frequency $f_{LO1}$ and the frequency $f_{LO2}$ in the first local oscillator 11 and the second local oscillator 14, respectively.

Here, the frequency setting unit 30 calculates Expressions (1) to (3) using the frequency shift amount $\Delta f$ that does not establish a relationship in Expression (6) below, such that the frequency $f_{SP2}$ of the second spurious signal $S_{SP2}$ is not included in the passed bandwidth W of the second BPF 16.

$$f_{IF2} - W/2 \leq f_{SP2} \leq f_{IF2} + W/2$$

$$-W/2 \leq |f_{SP1} - f_0 \pm f_{IF2} - \Delta f| - f_{IF2} \leq +W/2 \quad (6)$$

For example, in a case where a relationship in Expression (7) below is not established, the frequency setting unit 30 decides the frequency shift amount $\Delta f$ that satisfies $\Delta f = 0$. Meanwhile, in a case where the relationship in Expression (7) below is established, the frequency setting unit 30 decides the frequency shift amount $\Delta f$ that satisfies $\Delta f \geq 2W/3$ or $\Delta f \leq -2W/3$.

$$-W/2 \leq |f_{SP1} - f_0 \pm f_{IF2}| - f_{IF2} \leq +W/2 \quad (7)$$

For example, an example of $f_c$, $f_{SP1}$, $\Delta f$, $f_{IF1}$, $f_{LO1}$, $f_{LO2}$, $f_{SP2}$, and a value of a passed band of the second BPF 16 in a case where the passed center frequency $f_0$ of the first BPF 13 is 9.8 GHz and the passed center frequency $f_{IF2}$ of the second BPF 16 is 1.95 GHz is illustrated in FIG. 2. Here, in a case where the passed bandwidth W of the second BPF 16 is 310 MHz, the passed band of the second BPF 16 is 1.795 to 2.105 GHz centered at $f_{IF2} = 1.95$ GHz.

In this example, in a case where the center frequency $f_c$ of the measured signal $S_{RF}$ having a bandwidth of 100 MHz is within a range of 4.8 GHz $\leq f_c \leq$ 4.9 GHz, setting 0.35 GHz as the frequency shift amount $\Delta f$ not establishing the relationship in Expression (6) results in the first intermediate frequency $f_{IF1}$ of 10.15 GHz. In addition, in a case where the center frequency $f_c$ of the measured signal $S_{RF}$ having a bandwidth of 100 MHz is within a range of 4.9 GHz $< f_c \leq$ 5 GHz, setting -0.35 GHz as the frequency shift amount $\Delta f$ not establishing the relationship in Expression (6) results in the first intermediate frequency $f_{IF1}$ of 9.45 GHz. By doing so, the frequency $f_{SP2}$ of the second spurious signal $S_{SP2}$ deviates out of a range of $f_{IF2} - W/2 \leq f_{SP2} \leq f_{IF2} + W/2$, that is, out of a range of 1.795 to 2.105 GHz. Meanwhile, in a case where the center frequency $f_c$ of the measured signal $S_{RF}$ is within a range of $f_c < 4.8$ GHz or 5 GHz $< f_c$, the relationship in Expression (7) is not established. Thus, $\Delta f = 0$ is satisfied.

Figure 3A:
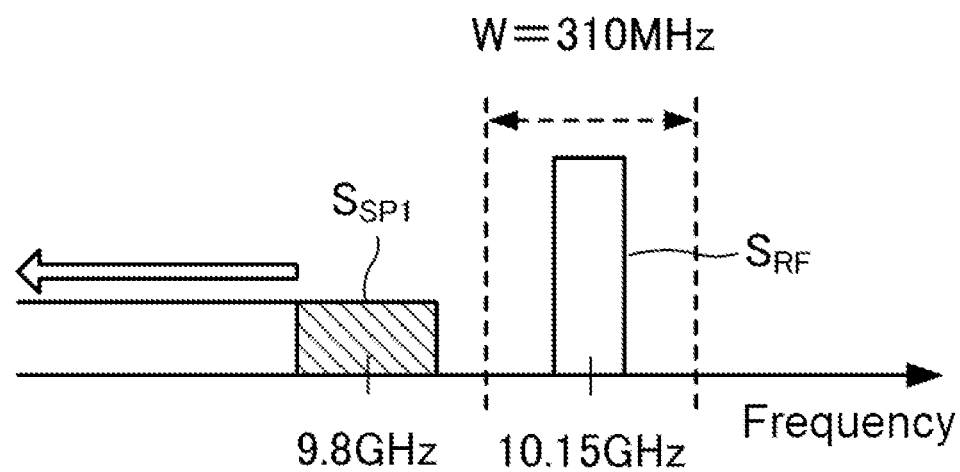
FIGS. 3A and 3B are diagrams schematically illustrating a frequency relationship among a bandwidth of a measured signal immediately after being output from a first BPF, a bandwidth of a first spurious signal, and a passed bandwidth of a second BPF.
Figure 3B:
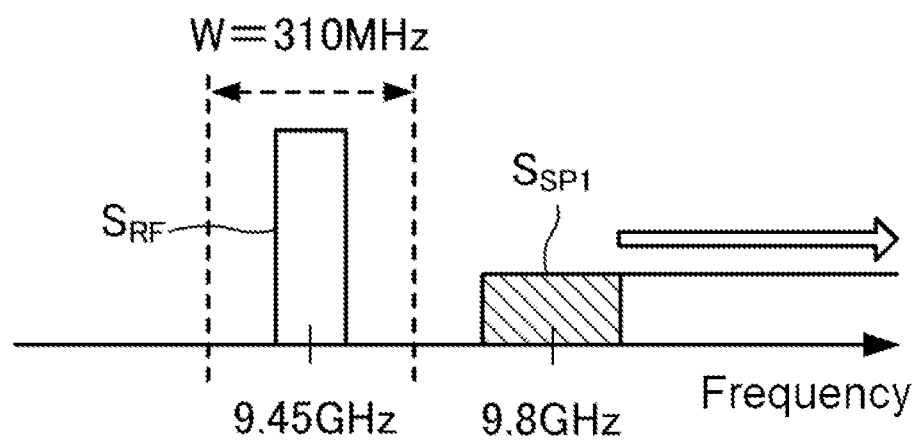

FIGS. 3A and 3B are diagrams schematically illustrating a frequency relationship among a band of the measured signal $S_{RF}$ immediately after being output from the first BPF 13, a band of the first spurious signal $S_{SP1}$, and the passed bandwidth W of the second BPF 16 in the example illustrated in FIG. 2. In this example, the bandwidth of the measured signal $S_{RF}$ is 100 MHz. Thus, a bandwidth of the first spurious signal $S_{SP1}$ is 200 MHz. In addition, a measurement bandwidth of the measured signal $S_{RF}$ in the signal analysis unit 40 of a rear stage and the passed bandwidth W of the second BPF 16 are 310 MHz.

FIG. 3A illustrates the frequency relationship in a case where the center frequency $f_c$ of the measured signal $S_{RF}$ is within a range of 4.8 GHz $\leq f_c \leq$ 4.9 GHz and $\Delta f$ is set to 0.35 GHz. In this case, the band of the first spurious signal $S_{SP1}$ does not overlap with a measurement band of the measured signal $S_{RF}$ at all times. In addition, as the center frequency $f_c$ of the measured signal $S_{RF}$ is decreased below 4.9 GHz, the band of the first spurious signal $S_{SP1}$ moves away from the measurement band of the measured signal $S_{RF}$.

FIG. 3B illustrates the frequency relationship in a case where the center frequency $f_c$ of the measured signal $S_{RF}$ is within a range of 4.9 GHz $\leq f_c \leq$ 5 GHz and $\Delta f$ is set to -0.35 GHz. Even in this case, the band of the first spurious signal $S_{SP1}$ does not overlap with the measurement band of the measured signal $S_{RF}$ at all times. In addition, as the center frequency $f_c$ of the measured signal $S_{RF}$ is increased above 4.9 GHz, the band of the first spurious signal $S_{SP1}$ moves away from the measurement band of the measured signal $S_{RF}$.

The signal analysis unit 40 illustrated in FIG. 1 analyzes the second intermediate frequency signal $S_{IF2}$ after the AD conversion performed by the AD converter 20 and includes a storage unit 41 and a baseband module 42.

The storage unit 41 stores digital data of the second intermediate frequency signal $S_{IF2}$ output from the AD converter 20.

The baseband module 42 generates orthogonal signals I(t) and Q(t) that are orthogonal to each other, by orthogonally demodulating the digital data of the second intermediate frequency signal $S_{IF2}$ stored in the storage unit 41. In addition, the baseband module 42 performs a predetermined signal analysis process on the generated orthogonal signals I(t) and Q(t). Examples of the signal analysis process executed by the baseband module 42 include temporally changing an amplitude (power), a phase, a frequency, or the like of the measured signal SRF and obtaining a channel power (CHP), an occupied bandwidth (OBW), an adjacent channel leakage ratio (ACLR), a burst average power, modulation accuracy (EVM)), a spectrum emission mask (SEM), a transmission power level, and a transmission spectrum mask.

The display unit 50 is configured with a display device such as an LCD or a CRT and displays various display contents such as a result of the signal analysis process performed by the signal analysis unit 40 in accordance with a display control performed by the control unit 52. Furthermore, the display unit 50 displays operation targets such as a button, a soft key, a pull-down menu, and a text box for setting a measurement condition and the like in accordance with a control signal output from the control unit 52.

The operation unit 51 receives an operation input of a user and is configured with, for example, a touch panel that is disposed on a surface of a display screen of the display unit 50. Alternatively, the operation unit 51 may be configured to include an input device such as a keyboard or a mouse. The operation input provided to the operation unit 51 is detected by the control unit 52. For example, the user can arbitrarily designate the center frequency $f_c$ of the measured signal $S_{RF}$, the passed center frequency $f_0$ of the first BPF 13, and the passed bandwidth W of the second BPF 16 using the operation unit 51.

For example, the control unit 52 is configured with a microcomputer or a personal computer including a CPU, a ROM, a RAM, an HDD, and the like and controls an operation of each of the units constituting the signal analysis apparatus 1. In addition, at least a part of the frequency setting unit 30 and the baseband module 42 can be configured in a software manner by causing the control unit 52 to move a predetermined program stored in the ROM or the like to the RAM and execute the predetermined program. At least a part of the frequency setting unit 30 and the baseband module 42 can be configured with a digital circuit such as a field programmable gate array (FPGA) or an application specific integrated circuit (ASIC). Alternatively, at least a part of the frequency setting unit 30 and the baseband module 42 can be configured by appropriately combining a hardware process performed by the digital circuit and a software process performed by the predetermined program.

Figure 4:
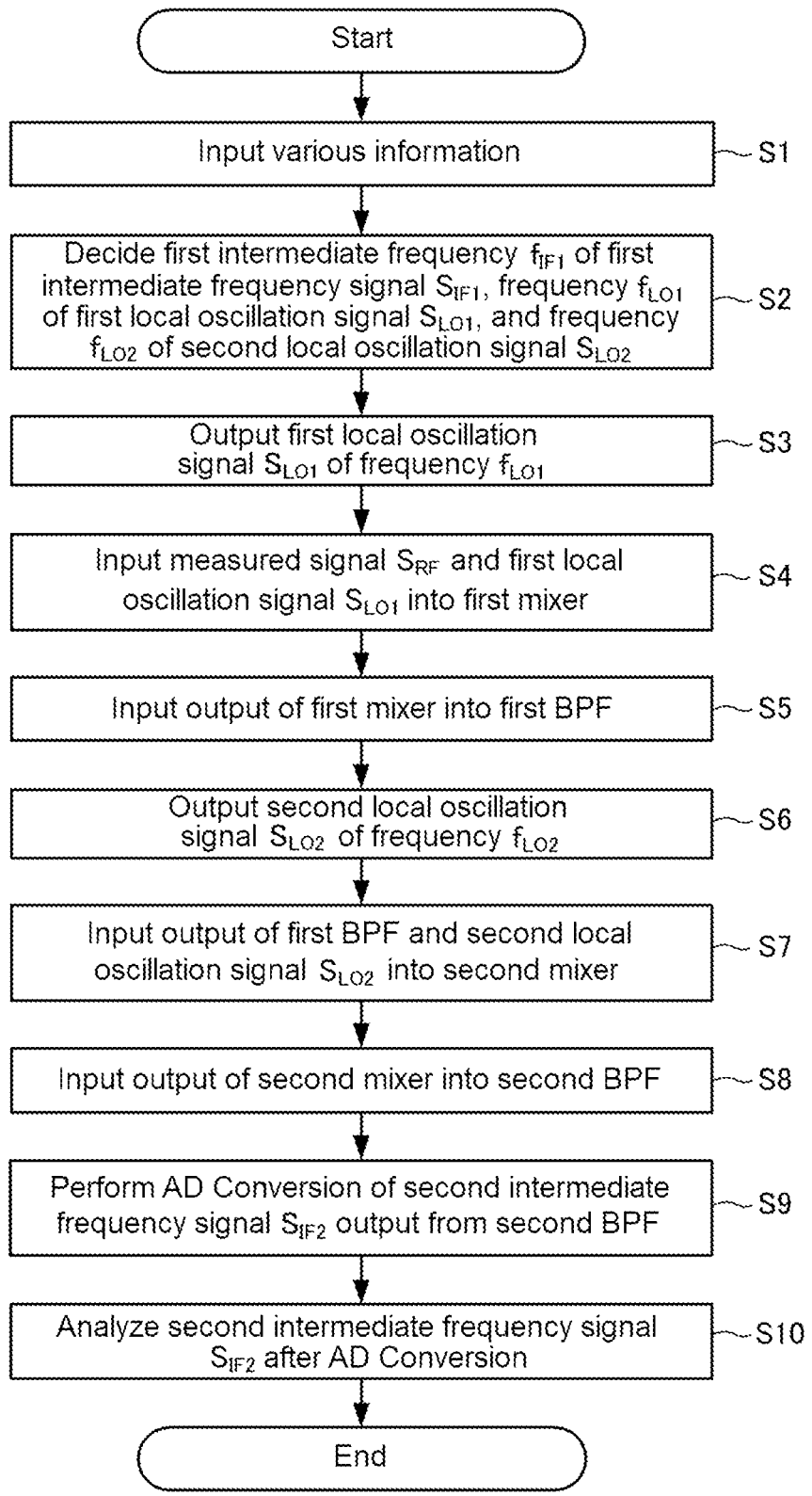
FIG. 4 is a flowchart for describing a process of a signal analysis method using the signal analysis apparatus according to the embodiment of the present invention.
Figure 5:
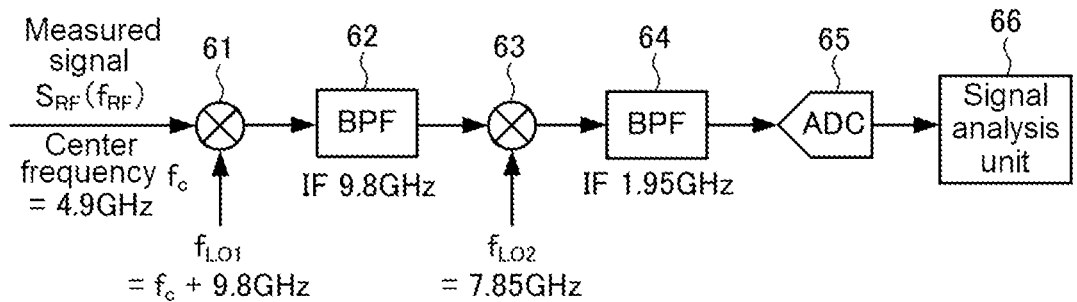
FIG. 5 is a block diagram illustrating a configuration of a signal analysis apparatus of the related art.
Figure 6:
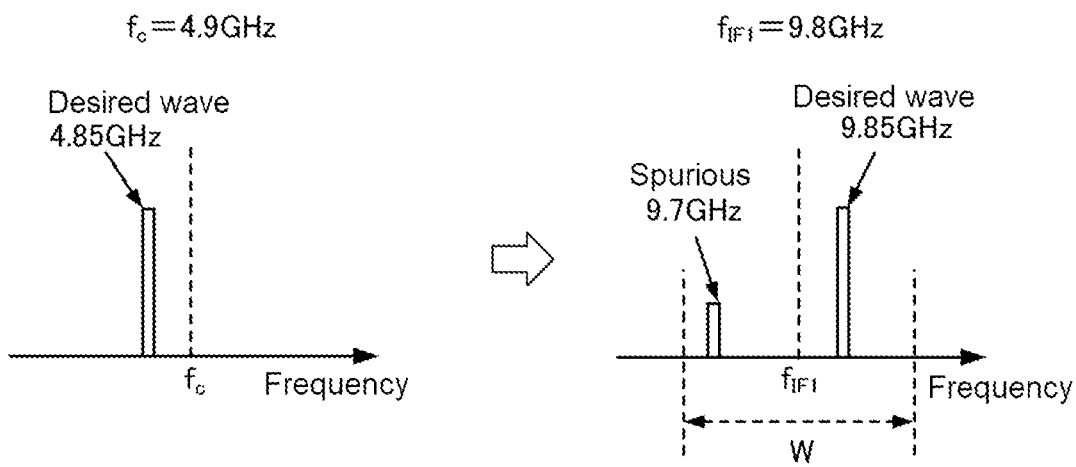
FIG. 6 is a diagram schematically illustrating a relationship between a desired wave and a spurious signal in the signal analysis apparatus in FIG. 5.

Hereinafter, an example of a process of the signal analysis method using the signal analysis apparatus 1 of the present embodiment will be described with reference to the flowchart in FIG. 4.

First, various information related to the frequency conversion, that is, information such as the center frequency $f_c$ of the measured signal $S_{RF}$, the passed center frequency $f_0$ of the first BPF 13, and the passed bandwidth W of the second BPF 16, are input by the operation input provided to the operation unit 51 by the user (step S1).

Next, the frequency setting unit 30 decides the first intermediate frequency $f_{IF1}$ of the first intermediate frequency signal $S_{IF1}$, the frequency $f_{LO1}$ of the first local oscillation signal $S_{LO1}$, and the frequency $f_{LO2}$ of the second local oscillation signal $S_{LO2}$ in accordance with the center frequency $f_c$ of the measured signal $S_{RF}$ depending on Expressions (1) to (3) above (frequency setting step S2). Here, in frequency setting step S2, Expressions (1) to (3) are calculated by deciding the frequency shift amount Δf not establishing the relationship in Expression (6).

Next, the first local oscillator 11 outputs the first local oscillation signal $S_{LO1}$ of the frequency $f_{LO1}$ (first local oscillation step S3).

Next, the first mixer 12 generates the first intermediate frequency signal $S_{IF1}$ of the first intermediate frequency $f_{IF1}$ by performing the frequency mixing of the measured signal $S_{RF}$ with the first local oscillation signal $S_{LO1}$, and generates the first spurious signal $S_{SP1}$ having the frequency $f_{SP1}$ of the second harmonic component of the measured signal $S_{RF}$ (first frequency mixing step S4).

Next, the output signals including the first intermediate frequency signal $S_{IF1}$ and the first spurious signal $S_{SP1}$ output from the first mixer 12 are input into the first BPF 13, and the first BPF 13 allows the first intermediate frequency signal $S_{IF1}$ and the first spurious signal $S_{SP1}$ to pass (first bandpass step S5).

Next, the second local oscillator 14 outputs the second local oscillation signal $S_{LO2}$ of the frequency $f_{LO2}$ (second local oscillation step S6).

Next, the second mixer 15 generates the second intermediate frequency signal $S_{IF2}$ by performing the frequency mixing of the first intermediate frequency signal $S_{IF1}$ passing through first bandpass step S5 with the second local oscillation signal $S_{LO2}$. In addition, the second mixer 15 generates the second spurious signal $S_{SP2}$ by performing the frequency mixing of the first spurious signal $S_{SP1}$ passing through first bandpass step S5 with the second local oscillation signal $S_{LO2}$ (second frequency mixing step S7).

Next, the output signals including the second intermediate frequency signal $S_{IF2}$ and the second spurious signal $S_{SP2}$ output from the second mixer 15 are input into the second BPF 16, and the second BPF 16 allows the second intermediate frequency signal $S_{IF2}$ to pass and removes the second spurious signal $S_{SP2}$ (second bandpass step S8).

The AD converter 20 performs the AD conversion of the second intermediate frequency signal $S_{IF2}$ passing through second bandpass step S8 (AD conversion step S9).

The signal analysis unit 40 analyzes the second intermediate frequency signal $S_{IF2}$ after the AD conversion in AD conversion step S9 (signal analysis step S10).

As described above, the signal analysis apparatus 1 according to the present embodiment decides the first intermediate frequency $f_{IF1}$, the frequency $f_{LO1}$, and the frequency $f_{LO2}$ in accordance with the center frequency $f_c$ of the measured signal $S_{RF}$ depending on Expressions (1) to (3) and the like. Accordingly, by varying the first intermediate frequency $f_{IF1}$, the frequency $f_{LO1}$, and the frequency $f_{LO2}$, the signal analysis apparatus 1 according to the present embodiment can analyze the measured signal $S_{RF}$ while avoiding a spurious harmonic of the measured signal $S_{RF}$ generated by the first mixer 12, without changing a configuration of hardware related to the frequency conversion. Furthermore, even in a case where a standard that uses a new band is established in the future, the signal analysis apparatus 1 according to the present embodiment can perform measurement that avoids a spurious harmonic, without changing the configuration of the hardware related to the frequency conversion.

In addition, since the first intermediate frequency $f_{IF1}$, the frequency $f_{LO1}$, and the frequency $f_{LO2}$ can be separately used by shifting the first intermediate frequency $f_{IF1}$, the frequency $f_{LO1}$, and the frequency $f_{LO2}$ by the frequency shift amount Δf, the signal analysis apparatus 1 according to the present embodiment can receive a desired wave of the second intermediate frequency $f_{IF2}$ while removing an unnecessary spurious harmonic of the frequency $f_{SP2}$ using the second BPF 16 of the passed bandwidth W. In other words, the signal analysis apparatus 1 according to the present embodiment can separate the first intermediate frequency $f_{IF1}$ and the frequency $f_{SP1}$ of the first spurious signal $S_{SP1}$ generated by the first mixer 12, using the second BPF 16 of the rear stage.

DESCRIPTION OF REFERENCE NUMERALS AND SIGNS

1: signal analysis apparatus
10: frequency conversion unit
11: first local oscillator
12: first mixer
13: first BPF
14: second local oscillator
15: second mixer
16: second BPF
20: AD converter
30: frequency setting unit
40: signal analysis unit
100: DUT

What is claimed is:

1. A signal analysis apparatus that analyzes a measured signal ($S_{RF}$) having a frequency component $f_{RF}$, the signal analysis apparatus comprising:
 a frequency setting unit that decides a first intermediate frequency $f_{IF1}$, a frequency $f_{LO1}$ of a first local oscillation signal, and a frequency $f_{LO2}$ of a second local oscillation signal in accordance with a center frequency $f_c$ of the measured signal;
 a first local oscillator that outputs the first local oscillation signal ($S_{LO1}$);
 a first mixer that generates a first intermediate frequency signal ($S_{IF1}$) of the first intermediate frequency $f_{IF1}$ by performing frequency mixing of the measured signal with the first local oscillation signal and generates a first spurious signal ($S_{SP1}$) including a second harmonic component of the measured signal;
 a first bandpass filter of a passed center frequency $f_0$ into which the first intermediate frequency signal and the first spurious signal are input;
 a second local oscillator that outputs the second local oscillation signal ($S_{LO2}$);
 a second mixer that generates a second intermediate frequency signal ($S_{IF2}$) of a second intermediate frequency $f_{IF2}$ by performing frequency mixing of the first intermediate frequency signal passing through the first bandpass filter with the second local oscillation signal and generates a second spurious signal ($S_{SP2}$) by performing frequency mixing of the first spurious signal passing through the first bandpass filter with the second local oscillation signal;
 a second bandpass filter of a passed bandwidth W into which the second intermediate frequency signal and the second spurious signal are input, and that allows the second intermediate frequency signal to pass and removes the second spurious signal;
 an AD converter that performs AD conversion of the second intermediate frequency signal passing through the second bandpass filter; and
 a signal analysis unit that analyzes the second intermediate frequency signal after the AD conversion performed by the AD converter,
 wherein the first intermediate frequency $f_{IF1}$ is provided as $f_0+\Delta f$,
 the frequency $f_{LO1}$ of the first local oscillation signal is provided as $f_c+f_0+\Delta f$,
 the frequency $f_{LO2}$ of the second local oscillation signal is provided as $f_0 \pm f_{IF2}+\Delta f$,
 a frequency $f_{SP1}$ of the first spurious signal is provided as $2 \times f_{RF}$,
 a frequency $f_{SP2}$ of the second spurious signal is provided as $|f_{SP1}-f_0 \pm f_{IF2}-\Delta f|$, and
 the frequency setting unit decides the frequency shift amount $\Delta f$ that does not establish a relationship of $-W/2 \leq |f_{SP1}-f_0 \pm f_{IF2}-\Delta f|-f_{IF2} \leq +W/2$, and decides the first intermediate frequency $f_{IF1}$, the frequency $f_{LO1}$ of the first local oscillation signal, and the frequency $f_{LO2}$ of the second local oscillation signal.

2. The signal analysis apparatus according to claim 1, wherein in a case where a relationship of $-W/2 \leq |f_{SP1}-f_0 \pm f_{IF2}|-f_{IF2} \leq +W/2$ is not established, the frequency setting unit decides the frequency shift amount $\Delta f$ as $\Delta f=0$.

3. The signal analysis apparatus according to claim 1, wherein in a case where a relationship of $-W/2 \leq |f_{SP1}-f_0 \pm f_{IF2}|-f_{IF2} \leq +W/2$ is established, the frequency setting unit decides the frequency shift amount $\Delta f$ capable of allowing the second intermediate frequency signal to pass and removing the second spurious signal at the second bandpass filter.

4. A signal analysis method for analyzing a measured signal ($S_{RF}$) including a frequency component $f_{RF}$, the signal analysis method comprising:
 a frequency setting step (S2) of deciding a first intermediate frequency $f_{IF1}$, a frequency $f_{LO1}$ of a first local oscillation signal, and a frequency $f_{LO2}$ of a second local oscillation signal in accordance with a center frequency $f_c$ of the measured signal;
 a first local oscillation step (S3) of outputting the first local oscillation signal ($S_{LO1}$);
 a first frequency mixing step (S4) of generating a first intermediate frequency signal ($S_{IF1}$) of the first intermediate frequency $f_{IF1}$ by performing frequency mixing of the measured signal with the first local oscillation signal, and generating a first spurious signal ($S_{SP1}$) including a second harmonic component of the measured signal;
 a first bandpass step (S5) of a passed center frequency $f_0$ into which the first intermediate frequency signal and the first spurious signal are input;
 a second local oscillation step (S6) of outputting the second local oscillation signal ($S_{LO2}$);
 a second frequency mixing step (S7) of generating a second intermediate frequency signal ($S_{IF2}$) of a second intermediate frequency $f_{IF2}$ by performing frequency mixing of the first intermediate frequency signal passing through the first bandpass step with the second local oscillation signal, and generating a second spurious signal ($S_{SP2}$) by performing frequency mixing of the first spurious signal passing through the first bandpass step with the second local oscillation signal;
 a second bandpass step (S8) of a passed bandwidth W into which the second intermediate frequency signal and the second spurious signal are input, the second intermediate frequency signal is allowed to pass, and the second spurious signal is removed;
 an AD conversion step (S9) of performing AD conversion of the second intermediate frequency signal passing through the second bandpass step; and
 a signal analysis step (S10) of analyzing the second intermediate frequency signal after the AD conversion in the AD conversion step,
 wherein the first intermediate frequency $f_{IF1}$ is provided as $f_0+\Delta f$,
 the frequency $f_{LO1}$ of the first local oscillation signal is provided as $f_c+f_0+\Delta f$,
 the frequency $f_{LO2}$ of the second local oscillation signal is provided as $f_0 \pm f_{IF2}+\Delta f$,
 a frequency $f_{SP1}$ of the first spurious signal is provided as $2 \times f_{RF}$,
 a frequency $f_{SP2}$ of the second spurious signal is provided as $|f_{SP1}-f_0 \pm f_{IF2}-\Delta f|$, and
 in the frequency setting step, the frequency shift amount $\Delta f$ that does not establish a relationship of $-W/2 \leq |f_{SP1}-f_0 \pm f_{IF2}-\Delta f|-f_{IF2} \leq +W/2$ is decided, and the first intermediate frequency $f_{IF1}$, the frequency $f_{LO1}$ of the first local oscillation signal, and the frequency $f_{LO2}$ of the second local oscillation signal are decided.

* * * * *